United States Patent

[11] 3,559,954

| [72] | Inventors | Henry B. Chambers; Clair W. Tellefson, Santa Barbara, Calif. |
|---|---|---|
| [21] | Appl. No. | 791,253 |
| [22] | Filed | Jan. 15, 1969 |
| [45] | Patented | Feb. 2, 1971 |
| [73] | Assignees | Hydranautics Santa Barbara, Calif., a corporation of California |

[54] HYDRAULIC GRIPPER AND MOVING JACK
7 Claims, 3 Drawing Figs.

| [52] | U.S. Cl. | 254/106 |
|---|---|---|
| [51] | Int. Cl. | B66f 1/00 |
| [50] | Field of Search | 254/35—37, 105—107 |

[56] References Cited
UNITED STATES PATENTS

| 2,621,892 | 12/1952 | Kilness | 254/35 |
|---|---|---|---|
| 3,033,525 | 5/1962 | Johnson | 254/107 |
| 3,373,971 | 3/1968 | Chambers | 254/107 |
| 3,464,095 | 9/1969 | Chambers | 254/107 |
| 3,486,737 | 12/1969 | Campbell | 264/106 |

*Primary Examiner*—Andrew R. Juhasz
*Assistant Examiner*—David R. Melton
*Attorneys*—Spensley and Horn

ABSTRACT: A hydraulic gripper and moving jack for moving heavy structures such as an oil derrick along a flanged member is disclosed. The gripper engages the flanged member with a frictional grip. The gripping forces are developed by a hydraulic cylinder which acts on the flanged member through hinged side plates; a second piston coupled to the heavy structure enables the structure to be walked along the flanged member.

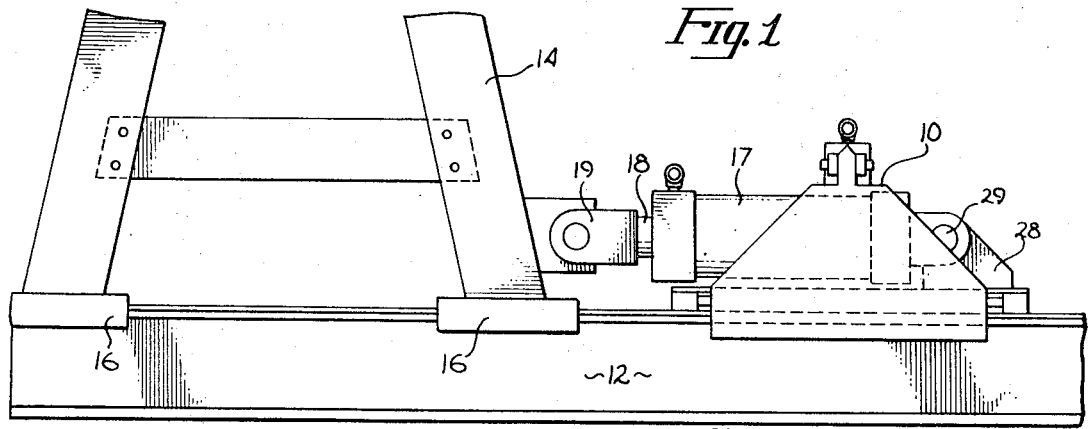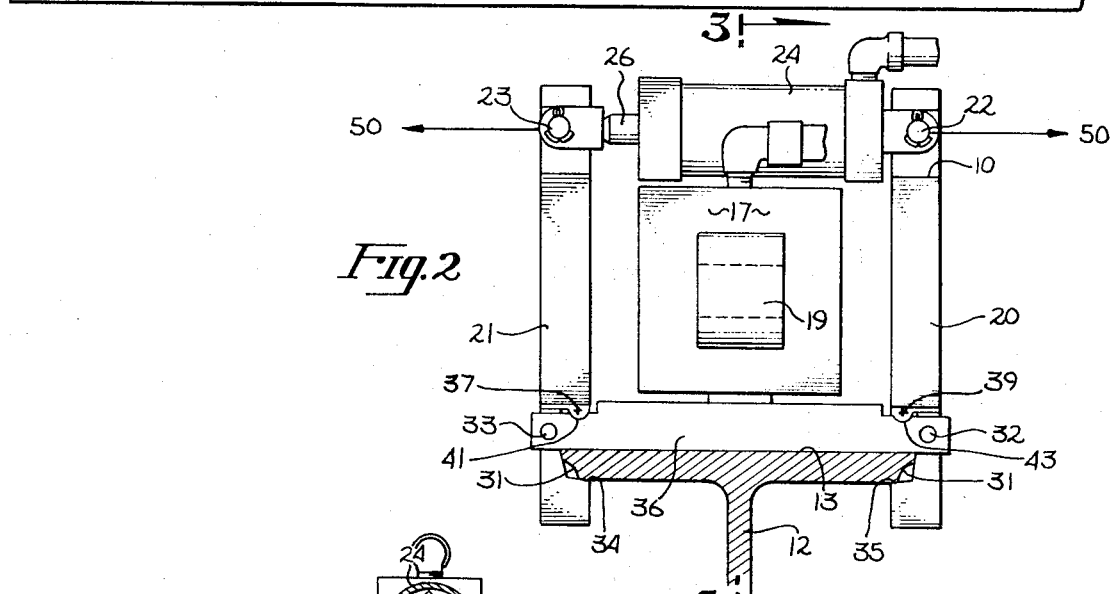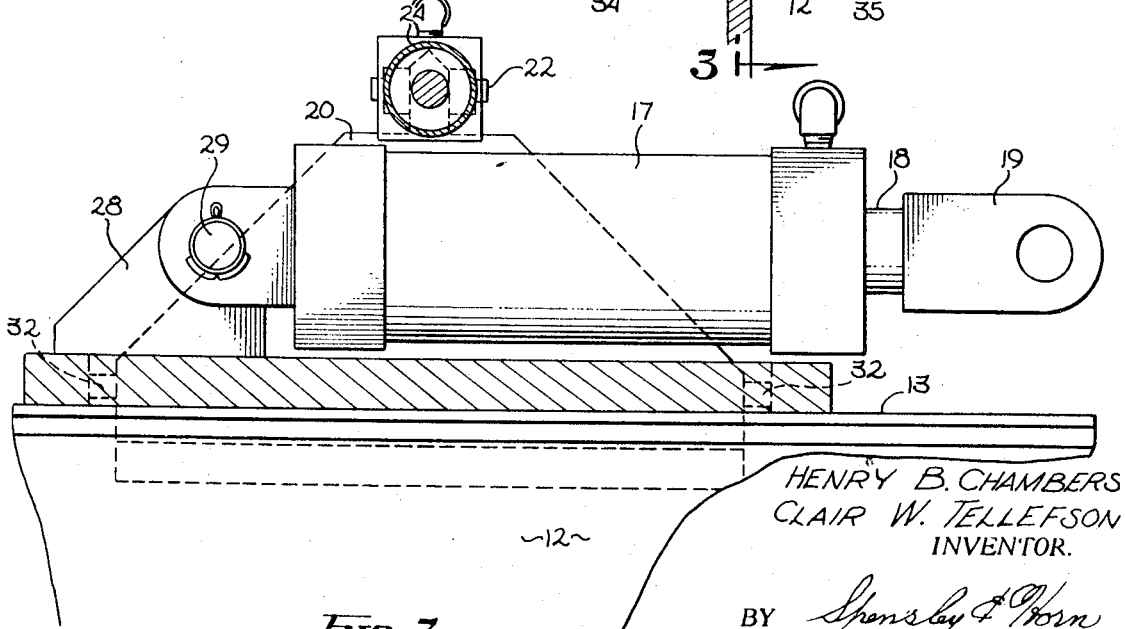

HYDRAULIC GRIPPER AND MOVING JACK

BACKGROUND OF THE INVENTION

1. Field of the Invention invention relates to the field of hydraulic or fluid grippers utilized for moving heavy objects.

2. Description of the Prior Art

U.S. Pat. No. 3,373,971 discloses a hydraulic gripper for derrick jacks. The present invention discloses several improvements over the prior invention.

Heavy loads such as oil derricks are often mounted on flanged members such as I-beams. I-beams are commonly utilized as support members for heavy loads since this shape provides a near maximum amount of strength per pound of material. In order to effectively move a heavy object over an I-beam, a gripper and jack must possess the following characteristics:

First, the gripper should grip on the upper and lower surface of the flange and not on the side surfaces of the flange as does certain prior art devices such as shown in U.S. Pat. No. 2,621,892. In general, grippers that engage the side of the flange are unsatisfactory since the flange has a small cross section and will not be capable of withstanding the required large griping forces without deforming.

Secondly, the gripping device should not mar or deform the flange but should rather engage the flange with a frictional lock. If the flange were deformed, it would be more difficult, if at all possible, to roll or skid a heavy object over the deformed surface.

SUMMARY OF THE INVENTION

A hydraulic gripper and moving jack comprising a first and second hydraulic means, a pair of jawlike side plates and a shoe. The first hydraulic means is coupled between the side plates which are pivotally mounted to engage one surface of the I-beams when pivoted. The shoe is constructed to engage the other surface of the I-beam. The sideplates act as a lever arm when moved by the first hydraulic means thereby creating a large gripping force between the jaws and shoe enabling a frictional engagement of the flange member. A second cylinder is coupled to the shoe and sequentially operated to allow the heavy object to be pulled or pushed away from or toward the gripper.

It is an object of this invention to provide a gripper and moving jack that does not deform the flanged member which it engages.

It is a further object of this invention to provide a gripper and moving jack for moving heavy objects along a flange member in either direction along the flanged member.

Another object of this invention is to provide a gripping device which utilizes the lever arm principle to obtain large gripping forces with a minimum of hydraulic equipment.

BRIEF DESCRIPTION OF THE DRAWINGS

FIG. 1 illustrates an oil derrick coupled to a hydraulic gripper and moving jack;

FIG. 2 is a front view of the hydraulic gripper and moving jack of FIG. 1; and,

FIG. 3 is a view of the hydraulic gripper and moving jack taken along section 3-3 of FIG. 2.

DETAILED DESCRIPTION OF THE INVENTION

In FIG. 1, the hydraulic gripper and moving jack 10 is shown coupled to the upper flange of I-beam 12. Jack piston rod 18 is coupled to the base of a heavy object, illustrated as derrick 14. Derrick 14 is mounted to slide on I-beam 12 by means of bearing plates 16. It is the object of the hydraulic gripper and moving jack 10 to move the heavy object, derrick 14, in either direction along I-beam 12. This is accomplished by "walking" the derrick as follows. Gripper 10 securely grips I-beam 12 with a frictional lock, then piston rod 18 is operated to either move derrick 14 toward or away from gripper 10. Following this, the gripper 10 is released and piston rod 18 is operated to move gripper 10 toward or away from derrick 14. Then the gripper again engages I-beam 12 with a frictional lock and the sequence is repeated. This operation generally referred to as "walking" is repeated thereby moving the derrick along the I-beam.

It may be desirous to have a plurality of hydraulic gripper and moving jacks coupled to the same heavy object. The derrick shown in FIG. 1 typically contains four legs and, therefore, up to four hydraulic gripper and moving jacks may be employed to move a single derrick. This will, in large, depend upon specific application criteria and requirements.

The gripper 10 should not deform the upper flanged surface of I-beam 12. If deformation occurs, bearing plates 16 would not move smoothly on the upper surface of I-beam 12 and as a result it would be extremely difficult to reliably and safely move derrick 14 for any reasonable length of time.

Referring to FIGS. 2 and 3, the construction of the hydraulic gripper and moving jack means 10 can be readily understood. The force for gripping I-beam 12 is produced within gripping cylinder 24. Cylinder 24 is pivotally coupled to sideplate 20 by pivot 22. The piston of cylinder 24 is pivotally coupled to sideplate 21 by pivot 23 via piston rod 26. Pivots 22 and 23 may be any one of numerous commonly utilized pivots preferably constructed from steel. Cylinder 24 may be any one of numerous commercially available hydraulic means suitable for actuation by hydraulic pressure. Any other hydraulic means may be used in place of cylinder 24, which would upon being actuated, move sideplates 20 and 21 in the directions of arrows 50. For example, a single cylinder having two pistons thereon and actuated by a single common hydraulic source may be employed. In applications for moving oil derricks, such as derrick 14 of FIG. 1, it has been found that pressures of approximately 5,000 p.s.i. provide suitable performance.

Sideplates 20 and 21 are generally triangularly shaped plates having jaws 34 and 35, respectively, as parts of the plates. Jaws 34 and 35 extend approximately the length of the base of the sideplates. The jaws are constructed to have an extended length so as to provide a maximum frictional engagement with the lower surface of the upper flange of I-beam. The length is, of course, not critical and depends on the particular application. Angle 31 of jaws 34 and 35 may be slightly obtuse so that the jaws will grip the flange when gripper cylinder 24 is actuated. Jaws 34 and 35 are preferably made of steel and may be an integral part of the side plates or are made separately and fastened to the sideplates by any commonly known fastening method such as welding. Sideplates 20 and 21 are loosely held together on shoe 36 by hinges 32 and 33, respectively, which also transmit and thrust. The actual pivoting of sideplates 20 and 21 along with the load transmission is accomplished by the cooperation of bearing surfaces 37 and 39 and curved shoe surfaces 41 and 43. These surfaces extend along a substantial portion of sideplates 20 and 21, thus providing extremely high load capacity and load distribution. Otherwise, shoe 36 is a substantially flat rectangular shaped metal shoe preferably made of steel, utilized for engaging the upper surface 13 of I-beam 12.

Cylinder 17 is pivotally coupled to mount 28 at 29. Mount 28 is rigidly fixed upon shoe 36 by conventional fastening means such as weldments or bolts. Pivot 29 may be similar to pivots 22 and 23.

Cylinder 17 and piston rod 18 may be of similar construction as cylinder 24 and piston rod 26. As in the case with cylinder 24 and piston rod 26, any other hydraulic means that would provide movement between derrick 14 and gripper 10 may be employed. Cylinder 17 is mounted on shoe 36 with its axis approximately perpendicular to the axis of cylinder 24 in a plane which is approximately parallel to plane containing cylinder 24. Piston 18 is equipped with eye bolt 19, which is made to coupled piston 18 with derrick 14 of FIG. 1.

The operation of the hydraulic gripper and moving jack means 10 can be readily understood from FIGS. 2 and 3.

When piston rod 26 is actuated, through the application of hydraulic power to line 17 of cylinder 24, sideplates 20 and 21 move in the direction shown by arrows 50. This direction of movement is reversed due to surfaces 37, 39, 41 and 43, thereby causing jaws 34 and 35 to engage the lower surface of I-beam 12. As this occurs, shoe 36 is forced to frictionally lock to the upper surface 13 of I-beam 12. Once means 10 has been locked to I-beam 12, piston rod 18 of cylinder 17 may be actuated to move the heavy object either toward or away from the gripper After the movement of the object, the gripper 10 is operated to release the I-beam. Then cylinder 17 is again operated but this time it moves gripper 10 with the heavy object remaining fixed. The angles 31 (along with the weight of the object) actuate the friction lock by a wedging action. As can be seen clearly in FIG. 2, pivots 22 and 23 are at a considerable distance from surfaces 37, 39, 41 and 43. This distance acts as a lever arm causing greater forces to be exerted on I-beam 12 than would otherwise be provided by cylinder 24 and piston 26. This amplification of the forces provided by cylinder 24 and piston 26 enables a more effective engagement of I-beam 12.

Thus, a hydraulic gripper and moving jack has been disclosed which enables a heavy object to be moved along a flanged member such as an I-beam without deforming the member.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

We claim:

1. A hydraulic gripper and moving jack for moving a heavy structure along a flanged member comprising:
    a pair of sideplates each having at least one edge;
    a pair of jaws for engaging the lower surface of said flange each disposed along said edges of said sideplates;
    a shoe for engaging one surface of said flange, and pivotally mounting at least one of said sideplates to engage said flange member;
    a first hydraulic means coupled to said sideplates to move at least one of said side plates about said pivot; and
    a second hydraulic means for moving said heavy object along said flanged member coupled to said shoe and being suitable for engaging said heavy structure;
    whereby a heavy structure may be moved along a flanged member by first gripping said flange member between said jaws and said shoe by actuating said first hydraulic means and secondly by actuating said second hydraulic means.

2. The hydraulic gripper and moving jack defined in claim 1 wherein:
    a first and second hydraulic means each comprises a cylinder and piston; and
    said first hydraulic means is coupled between said plates and both of said side plates are pivotally mounted and moved about said pivot by said first hydraulic means.

3. The hydraulic gripper and moving jack defined in claim 2 wherein said first and second cylinder and piston are approximately perpendicular to one another and in approximate parallel planes.

4. The hydraulic gripper and moving jack defined in claim 3 wherein said second cylinder is pivotally coupled to said shoe.

5. The hydraulic gripper and moving jack defined in claim 3 wherein said side plates are generally triangularly shaped with said jaws disposed along the base of said triangularly shaped sideplates.

6. The hydraulic gripper and moving jack defined in claim 5 wherein said hinged coupling between said sideplates and said shoe is approximately parallel to said base of said side plates.

7. A hydraulic gripper and moving jack for moving a heavy structure along an I-beam comprising:
    a pair of triangularly shaped sideplates each having a pair of jaws suitable for engaging the lower surface of the upper portion of said I-beam, each of said jaws disposed along one side of said triangularly shaped sideplates;
    a shoe for frictionally engaging the upper surface of the upper portion of said I-beam, hingingly coupled to said sideplates along a line in the proximity of and parallel to said jaws;
    a first hydraulic piston and cylinder for moving said sideplates about said hinges between said shoe and said sideplates, said cylinder hingingly coupled to said side plates in proximity of the angle of said triangularly shaped sideplate opposite said jaw and said piston hingingly coupled to said other sideplate in proximity of the angle of said triangularly shaped sideplate opposite said jaw; and
    a second hydraulic cylinder and piston, said cylinder hingingly coupled to said shoe and said piston being suitable for engaging said heavy structure; whereby a heavy structure may be moved along said I-beam by first gripping said flange member between said jaws and said shoe and secondly by actuating said second hydraulic means.